Dec. 28, 1954   W. VOGEL   2,698,086
ARRANGEMENT FOR REMOVING DUST FROM GRANULAR MATERIAL
Filed Jan. 10, 1952   5 Sheets-Sheet 1
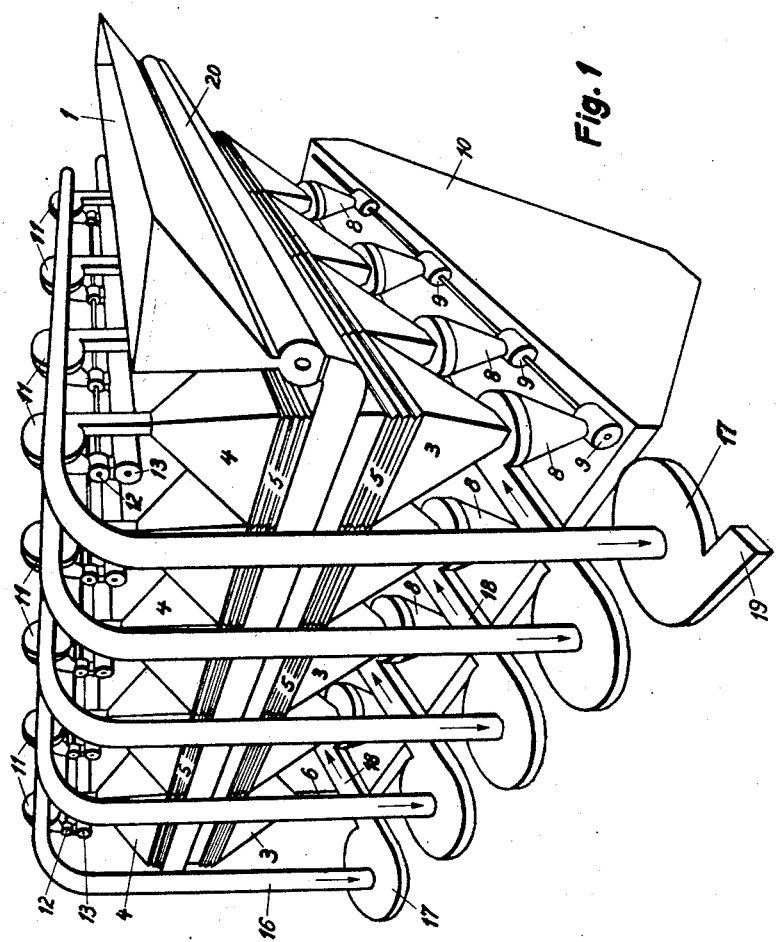
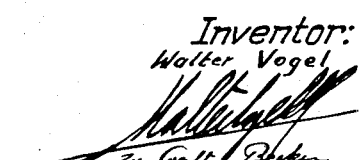
Inventor:
Walter Vogel

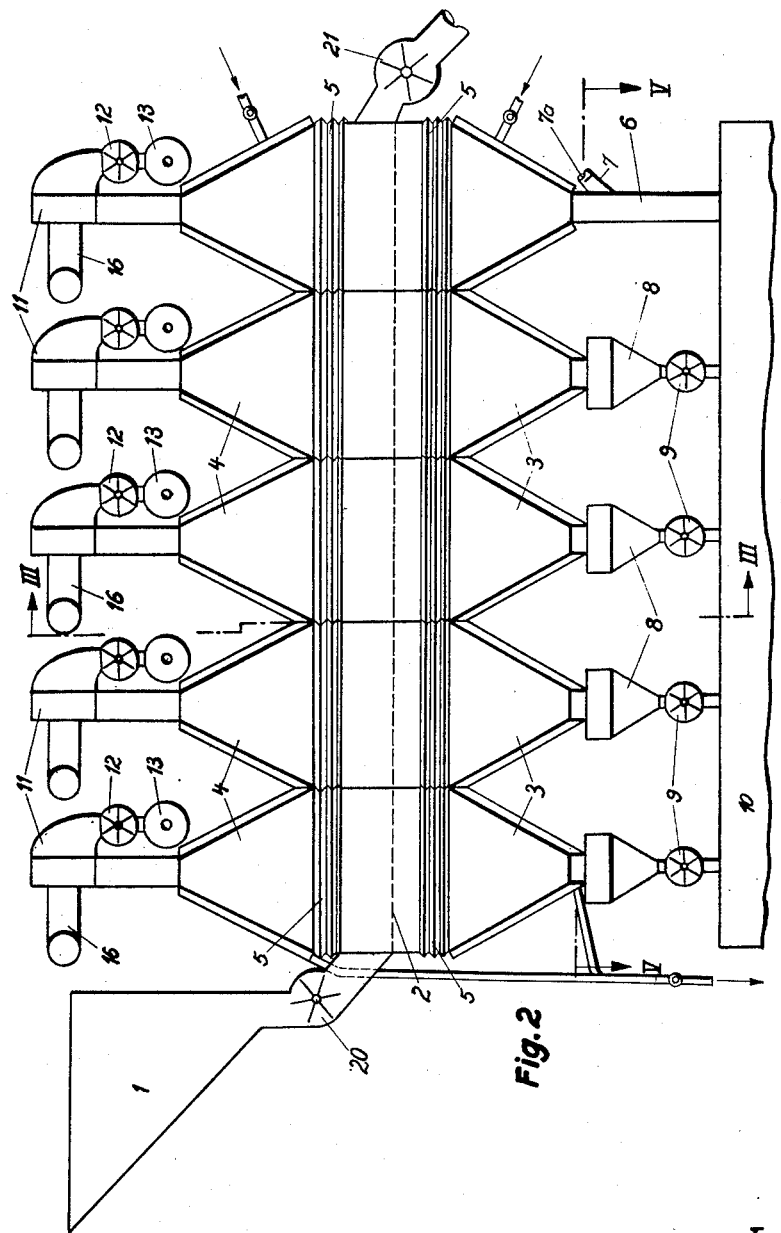

Dec. 28, 1954 W. VOGEL 2,698,086
ARRANGEMENT FOR REMOVING DUST FROM GRANULAR MATERIAL
Filed Jan. 10, 1952 5 Sheets-Sheet 5

Inventor:
Walter Vogel
by Walt. Becker
Patent Agent

United States Patent Office 2,698,086
Patented Dec. 28, 1954

2,698,086

ARRANGEMENT FOR REMOVING DUST FROM GRANULAR MATERIAL

Walter Vogel, Santiago, Chile

Application January 10, 1952, Serial No. 265,840

13 Claims. (Cl. 209—11)

In various engineering fields, particularly in connection with the processing of granular material, the problem of removing fines, e. g. dust, from granular material is frequently encountered. Heretofore, it has been attempted to solve this problem by screening or by removing the fines in an air current. However, as soon as rather fine granulations or humid material is involved, the screening fails, and the removal in an air current remains the only recourse.

With the air current removal arrangements heretofore known, the material from which the dust is to be removed has to be subjected to an air current from which the dust taken along is subsequently separated in precipitation devices as for instance cyclones.

Among others, there are also known separators in which the material to be freed from dust moves in form of a wide thin layer over a screen through which air is being blown. The air is then caught in cyclones or cloth filters in order to free the air from dust contained therein. The quantity of air needed for this purpose requires very large precipitation devices which take up considerable space and thus cause relatively high building costs. On the other hand, when blowing a large quantity of air through a correspondingly large screen surface, it cannot be avoided that crater-shaped openings form through which the air prefers to pass to the detriment of other surface portions of the screen from which less dust will then be removed.

With other separator constructions, it has been attempted to overcome the drawback just mentioned by using a pulsating air current instead of a continuous air current. However, these constructions still had the drawback that large closed quantities of air had to pass through the dust precipitating devices. This means high operating costs and relatively fast wear of the precipitating devices.

It is, therefore, an object of this invention to provide an arrangement for removing dust from granular material which will overcome the above mentioned drawbacks.

It is another object of this invention to provide a dust removing arrangement which will bring about a considerable saving in space with regard to similar devices intended for the removal of dust from granular material, as used heretofore.

It is a further object of this invention to provide an arrangement for removing dust from granular material which will effect an extensive removal of dust from the air current while using only a fraction of the quantity of air required with vibrating screen structures heretofore known.

It is still another object to provide a dust removing arrangement of the type set forth above, in which the air will more evenly blow through the screen to thereby bring about a more even removal of dust from the material to be processed.

A still further object of this invention consists in the provision of an arrangement for the removal of dust from granular material passing over a screen, in which variations in the thickness of the layer of material on said screen will cause only a minor variation in the air current which is being blown through the screen.

It is also an object to provide an improved and simplified method of removing dust from granular material which will materially reduce the cost of such removing process over methods heretofore known.

It is a still further object of this invention to provide a method of the type set forth in the preceding paragraph which will easily lend itself to the removal of dust from wet granular material.

These and other objects and advantages of the invention will appear more clearly from the following specification in connection with the accompanying drawings in which:

Fig. 1 is a perspective view of an arrangement according to the invention seen from the charging side thereof.

Fig. 2 is a diagrammatic side view, partly in section, of an arrangement according to the invention.

General arrangement

Figure 3:
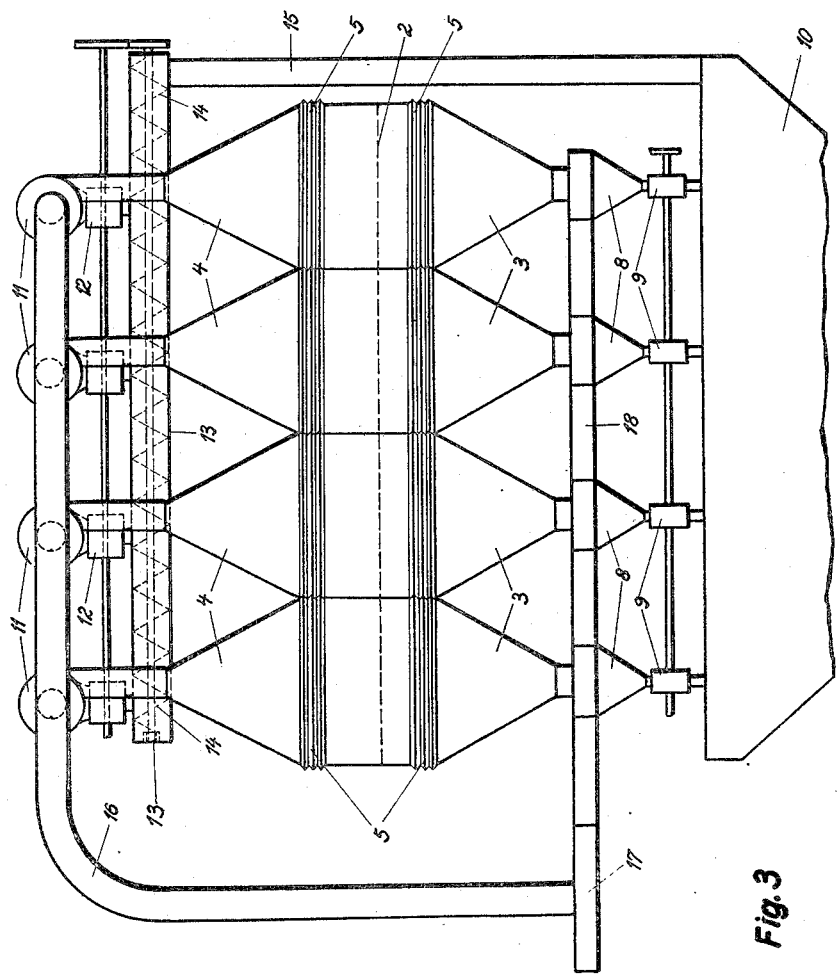
Fig. 3 is a cross section taken along the line III—III of Fig. 2.

The drawbacks inherent to the heretofore known devices for removing dust from granular material have been overcome according to the present invention by an arrangement which is characterized primarily in that the screen on which the granular material to be processed progresses is divided into zones through which in succession one and the same air current is passed, while between each two adjacent zones there are arranged means, e. g. cyclones, for removing the dust from the air current. The screen may, for instance, be an inclined stationary mesh sieve or a horizontal screen actuated in conformity with the conveying movement for the material to be processed. The arrangement is preferably such that the air current passes through the individual screen zones in an order or succession opposite to the progressive movement of the material to be processed. The screen zones are preferably subdivided into surface portions, while through the surface portions of each zone, sections of the air current pass which are substantially parallel to each other. The removal of dust is preferably effected by cyclones which are arranged so that cyclones are respectively provided above all surface portions, and also beneath all surface portions with the exception of those of the first zone. The use of the space beneath and above the screen results in a considerable saving of space, since no additional space is required for the placing of dust removal machinery. The rather numerous cyclones effect an extensive removal of dust from the air current which latter represents only a fraction of the quantity of air heretofore required with the vibrating screen arrangements known prior to this invention. Furthermore, the arrangement according to the invention safeguards an even flow of air through the screen so that the material is evenly processed throughout with regard to the removal of dust therefrom. This is due primarily to the fact that the air passing through the respective surface portion must prior to the entry into the respective screen portion pass through a cyclone below the same and, after having left said screen portion, must pass through a cyclone above said screen portion. This results in a considerably greater pressure drop than would prevail if the air had to pass merely through the screen and the material deposited thereon. Therefore, variations in the thickness of the layer of material on the screen can at best cause only a minor change in the air current.

Structural arrangement

Referring now to the drawing in detail, the structure shown therein comprises a charging funnel 1 into which the granular material to be processed is charged, and from where the said material is passed onto a horizontal screen 2. This screen 2 is ocillated in any convenient manner so as to cause the granular material to progress toward the discharging end of the arrangement. The screen surface is subdivided into square surface portions of which for instance every four are arranged in line side by side to form a screen zone. According to the embodiment shown in the drawing, five such screen zones are provided one behind the other, but it is, of course, understood that the number of screen zones may vary according to the requirements involved.

Below and above each surface portion there are arranged pyramidal connecting pieces 3 and 4 respectively for the admission and discharge of air. The pieces 3 and 4 are connected by means of bellows 5 to the casing taking part in the oscillating movement of the screen. To those lower connecting pieces 3 which pertain to the screen zone closest to the discharge end, there are connected down pipes 6 with upwardly slanted suction pieces 7 having a throttle valve 7a mounted therein. The remaining lower connecting pieces 3 are connected to cyclones 8 having their main axes arranged substantially vertically. The drop funnels of these cyclones lead to bucket wheels 9 which latter prevent short circuits between the individual cyclones. The cyclones 8 communicate with a dust collecter 10 common to all of said cyclones. This dust collector also receives the dust or fines passing through the down pipes 6. The upper connecting pieces 4 open tangentially into cyclones 11 having their main axes arranged substantially horizontally. The discharging funnels of every four cyclones arranged side by side have respectively associated therewith bucket wheels 12 through which they communicate with a pipe 13 common to said bucket wheels 12 and arranged transverse to the entire structure. In the pipe 13 there is mounted a worm conveyor 14, but it is to be understood that instead of a worm conveyor other types of conveyors such as the so-called Redler-conveyor may be used in which a scraper band moves in a closed trough-shaped casing. The pipes 13 respectively communicate through down pipes 15 with the dust collector 10.

Figure 4:
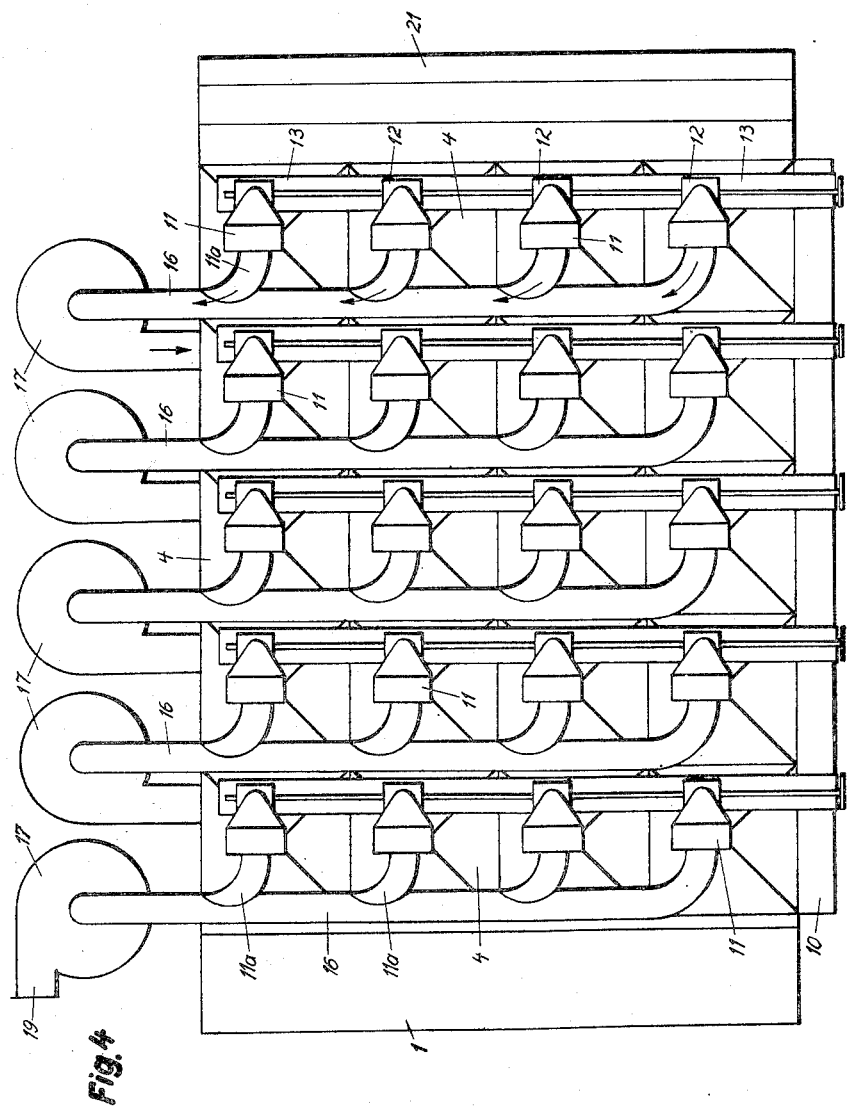
Fig. 4 is a top view of the new device according to the invention.
Figure 5:
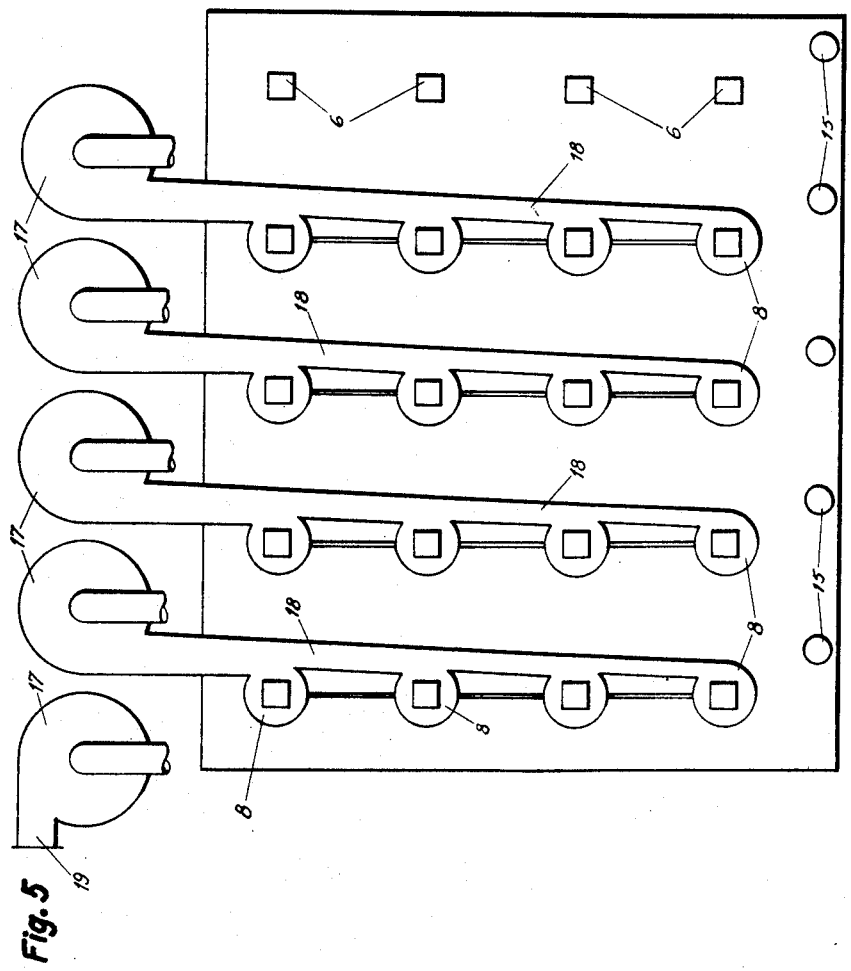
Fig. 5 represents a section taken along the line V—V of Fig. 2.

The central portions of every four of the upper cyclones 11 which pertain to one and the same screen zone, communicate through bent pipes 11a with a common suction conduit 16 of a fan or exhauster 17. The exhausters 17 have their main axes arranged substantially vertically and are placed at substantially the same level as the lower cyclones 8. The pressure conduits 18 of these exhausters 17 which on the suction side are connected with the first to the fourth screen zone, open tangentially into the lower cyclones 8 of the respective subsequent screen zone. The last exhauster 17, the pressure side of which is designated with the reference numeral 19 (Figs. 1, 4, and 5) delivers the air to a dust removal device (not shown in the drawing) which may consist for instance of small cyclones, hose filters, electric filters, wet dust removing means, or the like. Thus, the exhausters 17 deliver an air current in succession through the screen zones in an order which is opposite to the progress on the screen of the material to be processed. The coarse material drops through the screen and is separated in the cyclones 8 or drops through the pipes 6. The coarser ingredients of the dust above the screen which are carried away by the air current are separated by the cyclones 11 so that only the finer ingredients pass through the exhausters 17 which fact results in a reduction of the wear of the exhausters.

The exhausters 17 are so dimensioned and operated that the delivery power of the second to the fifth exhauster, when considering the same in the direction of their delivery, is somewhat greater than the delivery power of the respective preceding exhauster. In this way, it will be made sure that in the spaces above the screen there will always prevail a low pressure. However, this requires the provision of locks which take the form of bucket wheels 20 and 21 respectively provided at the charging and discharging end of the screen.

The arrangement according to the invention also makes it possible to remove dust from wet material, if the air during its passage through the structure is progressively heated. To this end, the lower and preferably also the upper connecting pieces 3 and 4 may be surrounded by heating jackets through which hot water or steam is passed. Advantageously, the water or the steam is passed through the heating jackets pertaining to the individual screen zones successively in an order which is opposite to the direction of movement of the material to be processed. In other words, the water or steam preferably passes in the same direction in which the air current passes through the individual screen zones.

In this connection it may be added that the heat which develops from the transformed energy delivered by the exhausters already brings about a drying of the material to be processed.

When processing rather humid material while working with heated air, the last removal of dust from the air may also be effected by cooling the air so as to cause the vapor in the air current to precipitate as drops which enclose the dust particles.

The arrangement according to the present invention has the further advantage that a great number of structurally the same parts may be used. Thus the cyclones with vertical axis as well as the cyclones with horizontal axis are assembled in series.

This results in a considerable reduction of the manufacturing costs of the entire assembly, particularly since extensive standardization may be effected.

The arrangement according to the invention may be used for processing coal as well as for any other type of pourable masses.

It is, of course, understood that the present invention is, by no means, limited to the particular construction shown in the drawings, but also comprises any modifications within the scope of the appended claims.

What I claim is:

1. In an arrangement for removing dust from granular material which includes a screen over which the material to be processed is passed, the combination of means subdividing said screen into a plurality of screen zones arranged one behind the other, air current producing means, conduit means communicating with said air current producing means and interconnecting said screen zones in series, thereby causing one and the same air current to pass in succession through all of said screen zones, and dust separating means communicating with said conduit means and interposed between each two adjacent zones for separating dust from the air current passing from one zone to the next zone.

2. In an arrangement for removing dust from granular material which includes a screen over which the material to be processed is moved, the combination of means subdividing said screen into a plurality of zones, air current producing means, conduit means communicating with said air current producing means and serially interconnecting said screen zones so that the space above each screen zone communicates through said conduit means, with the space below the next following screen zone when looking in the direction opposite to the direction of movement of said granular material, and dust separating means communicating with said conduit means and interposed between each two adjacent zones for separating dust from the air current passing from one zone to the next zone.

3. In an arrangement for removing dust from granular material which includes a screen over which the material to be processed is moved, the combination of a plurality of funnel-shaped means arranged adjacent said screen in a plurality of rows extending transverse to the direction of movement of said material so as to divide the screen into a number of successive zones corresponding in number to the number of said rows, the funnel-shaped means of each row subdividing the respective zone into a plurality of screen surface portions, air current producing means, conduit means communicating with said air current producing means and with said funnel-shaped means and serially interconnecting said screen zones so that the space adjacent the upper surface of each screen zone communicates through said conduit means with the space adjacent the lower surface of the next following screen zone when looking in the direction opposite to the direction of movement of said granular material, thereby causing one and the same air current to pass in succession through said zones while the air is passing through the screen surface portions of each zone in a plurality of substantially parallel and uni-directional air currents, a plurality of lower and upper cyclones communicating with said conduit means and being arranged so that, when looking in the direction of movement of the material to be processed, a cyclone is provided beneath each of said surface portions with the exception of those pertaining to the last screen surface zone, and that a cyclone is provided above all screen surface portions, each of the upper cyclones having its main axis arranged substantially horizontal, a plurality of worm conveyor means respectively communicating with all cyclones pertaining to one and the same screen surface zone for carrying away the separated dust, and dust collector means communicating with said conveyor means for receiving the dust therefrom.

4. In an arrangement for removing dust from granular material which includes a screen over which the material to be processed is moved, the combination of: a plurality of hood means arranged adjacent said screen in a plurality of rows extending transverse to the direction of movement of said material so as to divide the screen into a number of successive zones corresponding in number to the number of said rows, the hood means of each row subdividing the respective zone into a plurality of screen surface portions; a plurality of blower means; conduit means communicating with said blower means and with said hood means and serially interconnecting said screen zones for passing one and the same air current in succession through said zones while passing the air through the screen surface portions of each zone in a plurality of substantially parallel air currents; a plurality of lower and upper cyclones communicating with said conduit means and being arranged so that, when looking in the direction of movement of the material to be processed, a cyclone is provided beneath each of said surface portions with the exception of those pertaining to the last screen surface zone, and that a cyclone is provided above all screen surface portions; each of said blower means being arranged respectively to withdraw the air from the upper cyclones of one screen surface zone and, with the exception of the last fan means, to deliver the air to the lower cyclones of the next following screen surface zone.

5. An arrangement according to claim 4, in which the blower means are so dimensioned that, when looking in the direction of the air current, each blower means, with the exception of the first blower means, has a greater delivery power than the preceding blower means.

6. In an arrangement for removing dust from granular material which includes a screen over which the material to be processed is passed, the combination of means dividing said screen into a plurality of zones, air current producing means, conduit means communicating with said air current producing means and serially interconnecting said screen zones to pass one and the same air current in succession through said screen zones, dust separating means communicating with said conduit means and interposed between each two adjacent zones for separating dust from the air current passing from one zone to the next zone, and heating means arranged to heat said air current.

7. In an arrangement for removing dust from granular material which includes a screen over which the material to be processed is passed, the combination of a plurality of hood means arranged adjacent said screen in a plurality of rows extending transverse to the direction of movement of said material so as to divide the screen into a number of successive zones corresponding in number to the number of said rows, the hood means of each row subdividing the respective zone into a plurality of screen surface portions, conduit means communicating with said air current producing means and with said hood means and serially interconnecting said screen zones to thereby allow passing one and the same air current in succession through said zones while passing the air through the screen surface portions of each zone in a plurality of substantially parallel air currents, a plurality of lower and upper cyclones communicating with said conduit means and being arranged so that, when looking in the direction of movement of the material to be processed, a cyclone is provided beneath each of said surface portions with the exception of those pertaining to the last screen surface zone, and that a cyclone is provided above all screen surface portions, and a plurality of connecting pieces respectively connected to said lower and upper cyclones, at least the connecting pieces of said lower cyclones being provided with heating jackets to receive and convey a heat carrier.

8. In an arrangement for removing dust from granular material which includes a screen over which the material to be processed is moved, the combination of funnel-shaped means dividing said screen into a plurality of zones, air current producing means, conduit means communicating with said air current producing means and serially inter-connecting said screen zones, thereby causing one and the same air current to pass in succession through said screen zones, dust separating means communicating with said conduit means and interposed between each two adjacent zones for separating dust from the current passing from one zone to the next zone, and a plurality of heating jackets surrounding a portion of at least the lower cyclones for receiving and conveying a heat carrier, said heating jackets being interconnected in such a manner that the heat carrier successively passes through successive screen surface zones in a direction opposite to the direction of movement of the material to be processed.

9. In an arrangement for removing dust from wet granular material which includes a screen over which the material to be processed is moved, the combination of means funnel-shaped dividing said screen into a plurality of zones, air current producing means, conduit means communicating with said air current producing means and serially inter-connecting said screen zones to thereby cause one and the same air current to pass in succession through said screen zones, said air current producing means having its pressure side arranged so as to cause the air current to flow in a direction opposite to the direction of movement of said granular material, heating means for heating said air current, dust separating means associated with each but the last of said screen zones for removing dust from the air current passing therethrough, and cooling means associated with the last screen zone for cooling the air current passing therethrough to thereby bring about a further separation of dust from said air current.

10. In an arrangement for removing dust from granular material, which includes a screen over which the material to be processed is moved, the combination of: a plurality of funnel-shaped means arranged adjacent said screen in a plurality of rows extending transverse to the direction of movement of said material, thereby dividing said screen into a number of successive zones corresponding to the number of rows, the funnel-shaped means of each row subdividing the respective zone into a plurality of screen surface portions, air current producing means, conduit means communicating with said air current producing means and with said funnel shaped means and serially interconnecting said screen zones so that the space adjacent the upper surface of each screen zone communicates through said conduit means with the space adjacent the lower surface of the next following screen zone when looking in the direction opposite to the direction of movement of said granular material, thereby causing one and the same air current to pass in succession through said zones while the air is passing through the screen surface portions of each zone in a plurality of substantially parallel air currents, and dust separating means communicating with said conduit means and interposed between each two adjacent zones for separating dust from the air current passing from one zone to the next zone.

11. In an arrangement for removing dust from granular material, which includes a screen over which the material to be processed is moved, the combination of: a plurality of funnel-shaped means arranged adjacent said screen in a plurality of rows extending transverse to the direction of movement of said material so as to divide the screen into a number of successive zones corresponding in number to the number of said rows, the funnel-shaped means of each row subdividing the respective zone into a plurality of screen surface portions, air current producing means, conduit means communicating with said air current producing means and with said funnel-shaped means and serially interconnecting said screen zones so that the space adjacent the upper surface of each screen zone communicates through said conduit means with the space adjacent the lower surface of the next following screen zone when looking in the direction opposite to the direction of movement of said granular material, thereby causing one and the same air current to pass in succession through said zones while the air is passing through the screen surface portions of each zone in a plurality of substantially parallel and uni-directional air currents, and a plurality of cyclones communicating with said conduit means and being arranged so that, when looking in the direction of movement of the material to be processed, a cyclone is provided beneath each of said surface portions with the exception of those pertaining to the last screen surface zone, and that a cyclone is provided above all screen surface portions.

12. In an arrangement for removing dust from granular material, which includes a screen over which the material to be processed is moved, the combination of: a plurality of funnel-shaped means arranged adjacent said screen in a plurality of rows extending transverse to the direction of movement of said material so as to divide the screen into a number of successive zones corresponding in number to the number of said rows, the funnel-shaped means of each row subdividing the respective zone into a plurality of screen surface portions, air current producing means, conduit means communicating with said air current producing means and with said funnel-shaped means and serially interconnecting said screen zones so that the space adjacent the upper surface of each screen zone communicates through said conduit means with the space adjacent the lower surface of the next following screen zone when looking in the direction opposite to the direction of movement of said granular material, thereby causing one and the same air current to pass in succession through said zones while the air is passing through the screen surface portions of each zone in a plurality of substantially parallel and uni-directional air currents, a plurality of lower and upper cyclones communicating with said conduit means and being arranged so that, when looking in the direction of movement of the material to be processed, a cyclone is provided beneath each of said surface portions with the exception of those pertaining to the last screen surface zone, and that a cyclone is provided above all screen surface portions, each of the lower cyclones having its main axis arranged substantially vertically, a plurality of bucket wheels respectively communicating with said lower cyclones, and dust collector means communicating with said bucket wheels.

13. In an arrangement for removing dust from granular material, which includes a screen over which the material to be processed is moved, the combination of: a plurality of rows of upper hood means arranged near the upper surface of said screen and subdividing the same into a plurality of screen zones arranged one behind the other and corresponding in number to the number of said rows, the hood means of each row being arranged side by side, a plurality of lower hood means arranged near and below the lower surface of said screen and respectively arranged in substantial alignment with said upper hood means, a plurality of rows of upper cyclones respectively communicating with the rows of said upper hood means, a plurality of rows of lower cyclones respectively communicating with the rows of said lower hood means with the exception of the last row of lower hood means when looking in the direction of movement of the granular material to be processed, discharge pipe means communicating with the lower hood means of said last row, and a plurality of exhauster means respectively pertaining to the rows of upper cyclones, said exhauster means respectively having their inlet means in communication with said upper cyclones and respectively having their outlet means in communication with said lower cyclones with the exception of the outlet means of the first exhauster means when looking in the direction of movement of said granular material to be processed.

References Cited in the file of this patent

UNITED STATES PATENTS

| Number | Name | Date |
|---|---|---|
| 508,611 | Green | Nov. 14, 1893 |
| 933,053 | Bonson et al. | Sept. 7, 1909 |
| 1,563,238 | Stebbins | Nov. 24, 1925 |
| 1,650,727 | Stebbins | Nov. 29, 1927 |
| 1,801,255 | Arms | Apr. 21, 1931 |
| 1,812,072 | Arms | June 30, 1931 |
| 1,870,042 | Dorfan | Aug. 2, 1932 |
| 1,928,791 | Norman | Oct. 3, 1933 |

FOREIGN PATENTS

| Number | Country | Date |
|---|---|---|
| 255,344 | Great Britain | July 22, 1926 |
| 711,465 | France | Sept. 10, 1931 |
| 834,494 | France | Aug. 22, 1938 |